(12) United States Patent
Im et al.

(10) Patent No.: US 8,197,786 B2
(45) Date of Patent: Jun. 12, 2012

(54) POROUS CARBON MATERIAL AND METHOD OF MANUFACTURING THE SAME

(75) Inventors: Dong-min Im, Seoul (KR); Jeong-hee Lee, Seongnam-si (KR); Yong-nam Ham, Ansan-si (KR); Chan-ho Pak, Seoul (KR)

(73) Assignee: Samsung SDI Co., Ltd., Yongin-si (KR)

( * ) Notice: Subject to any disclaimer, the term of this patent is extended or adjusted under 35 U.S.C. 154(b) by 912 days.

(21) Appl. No.: 11/852,009

(22) Filed: Sep. 7, 2007

(65) Prior Publication Data
US 2008/0063591 A1  Mar. 13, 2008

(30) Foreign Application Priority Data

Sep. 7, 2006  (KR) .................. 10-2006-0086285

(51) Int. Cl.
| *C01B 31/00* | (2006.01) |
| *C01B 31/34* | (2006.01) |
| *C01B 31/04* | (2006.01) |
| *C01B 35/00* | (2006.01) |
| *C01B 31/02* | (2006.01) |
| *C01B 31/08* | (2006.01) |
| *B01J 20/00* | (2006.01) |
| *B01J 21/18* | (2006.01) |
| *B01J 23/00* | (2006.01) |

(52) U.S. Cl. ............ 423/445 R; 423/414; 423/440; 423/448; 423/276; 502/418; 502/423; 502/437; 502/412; 502/180; 502/182; 502/183; 502/184; 502/185; 977/700

(58) Field of Classification Search .............. None
See application file for complete search history.

(56) References Cited

U.S. PATENT DOCUMENTS

| 4,499,201 | A | * | 2/1985 | Leyerle .................. 502/180 |
| 4,873,318 | A | | 10/1989 | Theodoropulos |
| 5,958,367 | A | | 9/1999 | Ying et al. |
| 6,558,847 | B1 | | 5/2003 | Kawakami et al. |
| 6,585,948 | B1 | | 7/2003 | Ryoo et al. |
| 6,689,716 | B2 | | 2/2004 | Sabacky et al. |
| 6,812,187 | B1 | | 11/2004 | Pak et al. |
| 6,846,410 | B2 | | 1/2005 | McNeff et al. |

(Continued)

FOREIGN PATENT DOCUMENTS

CN         1467159 A      1/2004

(Continued)

OTHER PUBLICATIONS

Park et al.; Preparation and Pore-Characteristics Control of Nano-Porous Materials using Organometallic Building Blocks; Carbon Science; vol. 4, No. 1, pp. 1-9; Mar. 2003.*

(Continued)

*Primary Examiner* — Melvin C Mayes
*Assistant Examiner* — Guinever Gregorio
(74) *Attorney, Agent, or Firm* — Christie, Parker & Hale, LLP (57) ABSTRACT

Porous carbon materials and methods of manufacturing the same are provided. One method includes forming a carbon-metal oxide composite by heating a coordination polymer to form a carbon-metal oxide composite, and then removing the metal oxide from the carbon-metal oxide composite. The porous carbon material has an average pore diameter ranging from about 10 nm to about 100 nm, and a $d_{002}$ ranging from about 3.35 to 3.50 Å.

9 Claims, 5 Drawing Sheets

U.S. PATENT DOCUMENTS

| | | | |
|---|---|---|---|
| 7,097,781 B2 | | 8/2006 | Asakawa et al. |
| 2004/0092392 A1* | | 5/2004 | Wang et al. .................... 502/349 |
| 2005/0064731 A1 | | 3/2005 | Park et al. |
| 2006/0165995 A1* | | 7/2006 | Im et al. ......................... 428/408 |
| 2006/0231525 A1* | | 10/2006 | Asakawa et al. ................ 216/56 |
| 2007/0013094 A1 | | 1/2007 | Bischofsberger et al. |
| 2009/0301902 A1* | | 12/2009 | Gogotsi et al. .................... 206/7 |

FOREIGN PATENT DOCUMENTS

| | | |
|---|---|---|
| EP | 1 683 759 A1 | 7/2006 |
| JP | 57-209851 | 12/1982 |
| JP | 2001-163617 | 6/2001 |
| KR | 2001-0001127 | 1/2001 |
| KR | 10-2002-0088143 | 11/2002 |
| KR | 10-2004-0009541 | 1/2004 |
| KR | 10-2006-0015252 | 2/2006 |
| KR | 10-2006-0085163 | 7/2006 |
| WO | WO 2004/101433 A3 | 11/2004 |

OTHER PUBLICATIONS

Stuart L. James, "Metal-organic frameworks", Chem. Soc. Rev., 2003, 32, pp. 276-288.

Christoph Janiak, "Engineering coordination polymers towards application", Dalton Trans., 2003, pp. 2781-2804.

Korean Patent Abstracts, Publication No. 1020060085163 A; Date of Publication: Jul. 26, 2006; in the name of Dong Min Im, et al.

Office Action dated Aug. 9, 2007 for corresponding Korean Patent Application No. 10-2006-0086285.

SIPO Office action dated Aug. 12, 2010, for corresponding Chinese Patent application 200710149065.2, with English translation, noting U.S. references 2006/0231525, 2006/0165995, and 2004/0092392, all previously cited in U.S. Office action dated Jun. 24, 2010 in this application.

SIPO Office action dated Oct. 9, 2009, for Chinese application 200610163634.4, with English translation noting listed Chinese reference in this IDS, as well as U.S. Patent 6,689,916.

U.S. Office action dated Sep. 21, 2009 for related U.S. Appl. No. 11/607,409.

U.S. Office action dated Mar. 10, 2010 for related U.S. Appl. No. 11/607,409.

U.S. Office action dated Jun. 29, 2011, for cross reference U.S. Appl. No. 12/784,243, 15 pages.

U.S. Office action dated Nov. 23, 2011, for cross reference U.S. Appl. No. 12/784,243, 7 pages.

English machine translation of Japanese Publicaiton 2001-163617, listed above, 34 pages.

KIPO Registration Determination Certificate dated Feb. 11, 2008, for Korean Patent application 10-2006-0086285, 4 pages.

SIPO Office action dated Jan. 26, 2011 (with English Translation), for Chinese Patent application 200610163634.4, 11 pages.

* cited by examiner

POROUS CARBON MATERIAL AND METHOD OF MANUFACTURING THE SAME

CROSS-REFERENCE TO RELATED PATENT APPLICATION

This application claims priority to and the benefit of Korean Patent Application No. 10-2006-0086285, filed on Sep. 7, 2006 in the Korean Intellectual Property Office, the entire content of which is incorporated herein by reference.

BACKGROUND OF THE INVENTION

1. Field of the Invention

The present invention relates to porous carbon materials and methods of manufacturing the same.

2. Description of the Related Art

In general, carbon materials are formed of non-graphite carbon and have hexagonal crystalline structures. Carbon materials are known to have Van der Waals bonds in the c-axis direction and covalent bonds on surfaces vertical to the c-axis, resulting in high anisotropic properties. Also, carbon materials have high specific surface areas and well-developed pore structures, and are thus widely used in a variety of fields.

For example, porous carbon materials can be used as cathode active materials of lithium secondary batteries. Carbon materials store lithium ions in the cathodes of lithium secondary batteries, and since pores are well developed in particles of the porous carbon materials, ions can be easily transferred. Thus, porous carbon materials can be utilized as matrices for high capacity low-conducting cathode active materials.

Also, porous carbon materials can store great amounts of charge on their surfaces, and thus can be used as electrode materials of electrochemical double layer capacitors or as electrode materials for ion absorption of water softeners.

Porous carbon materials can be prepared using a sol gel method, a template method, or the like. For example, one method of preparing a porous carbon material includes cross-linking resorcinol and formaldehyde under critical conditions and then heating the resultant material. An alternative method of preparing porous carbon materials uses ordered mesoporous silicon particles as a template.

SUMMARY OF THE INVENTION

In one embodiment of the present invention, a method of manufacturing porous carbon materials uses a coordination polymer.

In another embodiment of the present invention, porous carbon materials are prepared using the method.

According to an embodiment of the present invention, a method of manufacturing porous carbon materials includes forming a carbon-metal oxide composite by treating a coordination polymer, and removing the metal oxide from the carbon-metal oxide composite. The method may further include a first heat treatment process in which the coordination polymer is heat treated in an inert atmosphere to produce a carbon-metal composite, and a second heat treatment process in which the carbon-metal composite is heat treated in an oxygen-containing atmosphere to produce a carbon-metal oxide composite.

The coordination polymer may be a compound having a unit cell structure represented by Formula 1 below, $$M_xL_yS_z \quad \text{Formula 1}$$

In Formula 1, M is a metal selected from transition metals, Group 13 metals, Group 14 metals, Group 15 metals, lanthanides, actinides and combinations thereof. L is a multi-dentate ligand simultaneously forming ionic or covalent bonds with at least two metal ions. S is a monodentate ligand forming an ionic or covalent bond with one metal ion. When the number of functional groups of L that can bind to the metal ion is d, then x, y and z are integers satisfying $yd+z \leq 6x$.

According to another embodiment of the present invention, porous carbon materials have an average pore diameter ranging from about 10 nm to about 100 nm, and a $d_{002}$ ranging from about 3.35 to about 3.50.

In one embodiment, the porous carbon materials may have multilateral shapes.

In another embodiment, the porous carbon materials may have needle-shaped or plate-shaped particles.

BRIEF DESCRIPTION OF THE DRAWINGS

The above and other features and advantages of the present invention will become more apparent by reference to the following detailed description when considered in conjunction with the attached drawings in which.

DETAILED DESCRIPTION OF THE INVENTION

In one embodiment of the present invention, a porous carbon material is obtained by heating a coordination polymer compound to prepare a carbon-metal oxide composite and then removing the metal oxide from the carbon-metal oxide composite.

The coordination polymer provides a new approach to the synthesis of composites and has a repeating unit having a one-, two-, or three-dimensional morphology compared to a general coordination compound represented by Formula 2.

Formula 2

An example of a two-dimensional coordination polymer is a compound represented by Formula 3.

Formula 3

In Formula 3, M, L and S are as defined below.

In the two-dimensional coordination polymer of Formula 3, four ligands (L) having multiple functional groups (hereinafter, multi-dentate ligands) and two monodentate ligands (S) coordinate to a metal (M) atom. The multi-dentate ligands (L) also coordinate to other adjacent metal (M) atoms. In this case, the metal (M) atom of the two-dimensional coordination polymer of Formula 3 provides ligands with coordination sites as in the general coordination compound of Formula 2. However, ligands of the two-dimensional coordination polymer of Formula 3 coordinate to multiple metal atoms at the same time. Multi-dentate ligands in which one ligand coordinates to two metals at the same time (as in Formula 3) form coordination polymers having very regular lattice structures as a whole. Such a structure can be extended to a three-dimensional structure. This is because, unlike in a planar-type coordination polymer, the multi-dentate ligands of Formula 3 can further coordinate to metal atoms or ligands located above or below them to form a three-dimensional coordination polymer.

According to one embodiment of the invention, the coordination polymer used to form the carbon-metal composite upon a first heat treatment process may be a compound represented by Formula 1.

$M_xL_yS_z$ <span style="float:right">Formula 1</span>

In Formula 1, M is a metal selected from transition metals, Group 13 metals, Group 14 metals, Group 15 metals, lanthanides, actinides and combinations thereof. L is a multi-dentate ligand simultaneously forming ionic or covalent bonds with at least two metal ions. S is a monodentate ligand forming an ionic or covalent bond with one metal ion. When the number of functional groups of L that can bind to the metal ion is d, then x, y and z are integers satisfying $yd+z \leqq 6x$.

The compound of Formula 1 is a coordination polymer having a network structure formed by the binding of a multi-dentate ligand having multiple functional groups to at least two metal atoms or ions at the same time, thereby connecting metal atoms or ions to form the network structure. The coordination polymer is a crystal and thus has a multilateral shape. The coordination polymer often has a monoclinic or triclinic unit cell and thus has needle-shaped or plate-shaped crystals, but the coordination polymer is not limited to these crystal structures. Such a coordination polymer may optionally include a monodentate ligand (S) which can bind to a metal atom or ion irrespective of the multi-dentate ligand (L).

The structure of the coordination polymer of the present embodiment is different from that of a chelate compound. A chelate compound is a general compound in which a multi-dentate ligand binds to a metal ion, and has a different structure from the coordination polymer of the present embodiment. That is, in a chelate compound, for example, a multi-dentate ligand (such as ethylene diamine) coordinates to a metal ion, and a network structure is not formed as it is in the coordination polymer of the present embodiment. Instead, a single coordination compound in which the multi-dentate ligand forms a chelate ring is obtained. In the coordination polymer of the present embodiment, neighboring metals are essentially linked to each other through multi-dentate ligands to form a network structure. In contrast, in the chelate compound, multi-dentate ligands coordinate to only one metal ion at multiple sites, and thus do not form a network structure, and cannot form a coordination polymer according to the present invention.

When a network structure is formed through multi-dentate ligands (L), core metal ions or atoms need not form coordination bonds only with multi-dentate ligands (L) and, if necessary, may bind to monodentate ligands (S). That is, multi-dentate ligands (L) are necessary, but monodentate ligands (S) are further included if desired. The monodentate ligands (S) may be any ligands used in general coordination compounds. Nonlimiting examples of suitable ligands for the monodentate ligands (S) include ligands containing N, O, S, P, As, etc. and having lone pair electrons. For example, $H_2O$, $SCN^-$, $CN^-$, $Cl^-$, $Br^-$, $NH_3$ and the like can be used as the monodentate ligands (S). However, the monodentate ligands S can also have multiple functional groups. In addition, when a chelate ring is formed, a multi-dentate ligand (L) can be used. That is, although multi-dentate ligands (L) such as bidentate ligands, tridentate ligands, tetradentate ligands, etc. can be used, if metal atoms or ions can form a network structure through other ligands, these other ligands can also be used.

A multi-dentate ligand (L) capable of linking metal ions or atoms to form a network may be any ligand having at least two functional groups capable of forming a covalent or ionic bond with the core metal to form a network structure. In particular, the multi-dentate ligand (L) of the present embodiment must be distinguished from a multi-dentate ligand (L) coordinating to only one metal ion to form a chelate ring (i.e., a chelate ligand) as described above. This is because it is difficult to form a coordination polymer having a network structure with a chelate ligand.

Nonlimiting examples of suitable multi-dentate ligands (L) include trimesate-based ligands represented by Formula 4, terephthalate-based ligands represented by Formula 5, 4,4'-bipyridine-based ligands represented by Formula 6, 2,6-naphthalenedicarboxylate-based ligands represented by Formula 7, and pyrazine-based ligands represented by Formula 8.

Formula 4

Formula 5

Formula 6

Formula 7

Formula 8

In Formulae 4 through 8, each of $R_1$ through $R_{25}$ is independently selected from hydrogen atoms, halogen atoms, hydroxy groups, substituted and unsubstituted $C_{1-20}$ alkyl groups, substituted and unsubstituted $C_{1-20}$ alkoxy groups, substituted and unsubstituted $C_{2-20}$ alkenyl groups, substituted and unsubstituted $C_{6-30}$ aryl groups, substituted and unsubstituted $C_{6-30}$ aryloxy groups, substituted and unsubstituted $C_{2-30}$ heteroaryl groups, and substituted and unsubstituted $C_{2-30}$ heteroaryloxy groups.

These multi-dentate ligands (L) are described in more detail in Chistoph Janiak, *Dalton Trans.*, 2003, p 2781-2804, and Stuart L. James, *Chem. Soc. Rev.*, 2003, 32, 276-288, the entire contents of which are incorporated herein by reference.

The metal bound to the multi-dentate ligands (L) to form the coordination polymer is not limited as long as it can provide the multi-dentate ligands (L) with coordination sites. Nonlimiting examples of suitable metals include transition metals, Group 13 metals, Group 14 metals, Group 15 metals, lanthanides and actinides. For example, Fe, Pt, Co, Cd, Cu, Ti, V, Cr, Mn, Ni, Ag, Pd, Ru, Mo, Zr, Nb, La, In, Sn, Pb, Bi, etc. can be used.

Regarding the coordination number in Formula 1, x, y and z are integers satisfying $yd+z \leqq 6x$, where d denotes the number of functional groups of the multi-dentate ligand (L) which can bind to the metal. For example, when L is a tetradentate ligand and two monodentate ligands S coordinate to the metal, the coordination polymer has a basic structure of $MLS_2$ and satisfies the equation $1(y) \times 4(d)+2(z)=6 \times 1(x)$. Since the multi-dentate ligand (L) is essential to form a network, y is at least 1. Also, since the monodentate ligand (S) is an optional element, z is at least 0. It will be understood by those skilled in the art that x, y and z do not represent the specific number of atoms, but indicate ratios of metals and ligands in view of the nature of polymers. When a core metal M is Cd and the multi-dentate ligand L is 4,4'-bipyridine, the coordination polymer according to one embodiment is a compound represented by Formula 9 (where x is 1, and y and z are each 2).

Formula 9

In the coordination polymer of Formula 9, 4,4'-bipyridine coordinates to Cd, which is the core metal (M). Specifically, a terminal nitrogen atom of 4,4'-bipyridine binds to a Cd ion and another terminal nitrogen atom of 4,4'-bipyridine binds to another Cd ion. This binding pattern is repeated to form a network, thereby obtaining a coordination polymer having a two-dimensional lattice structure. Such a coordination polymer structure affects the final shape, for example, periodicity, etc. of the carbon-metal composite obtained by heat-treating the coordination polymer. Thus, when the process of forming the coordination polymer is properly controlled, the shape of the final product can be controlled. The crystalline shape of the coordination polymer can be controlled by properly modifying reaction temperature, pH, reaction time for the metal precursor and ligands to bind to each other, the type of metal, the type of ligand and concentrations thereof. Alternatively, the crystalline shape may be controlled by properly controlling the drying temperature and time to obtain the coordination polymer in a crystalline state.

The porous carbon material according to one embodiment of the present invention is obtained by heating a coordination polymer to obtain a carbon-metal oxide composite and then removing the metal oxide from the composite.

The heat treatment may include a first heat treatment process under an inert atmosphere, and a second heat treatment process under an oxygen-containing atmosphere. Alternatively, the heat treatment may be performed as a single operation either under an inert atmosphere or under an oxygen-containing atmosphere to prepare a carbon-metal oxide composite.

The first heat treatment process under an inert atmosphere may be performed at a temperature ranging from about 700° C. to about the melting point of the corresponding metal for about 0.1 to about 10 hours. In one embodiment, for example, the first heat treatment is performed for from about 0.5 to about 3 hours. It is understood that the first heat treatment process is not limited to this process. When the temperature of the first heat treatment process is less than about 700° C., carbonization is not sufficient. When the temperature of the first heat treatment process is greater than about the melting point of the corresponding metal, the structure of the nano composite itself is likely to collapse due to the melting and aggregation of metal particles. When the first heat treatment processing time is less than about 0.1 hours, the effect of the heat treatment is insufficient. When the first heat treatment processing time is greater than about 10 hours, the heat treatment is not economical.

When the coordination polymer is subjected to the first heat treatment process as described above, all volatiles and combustible parts are vaporized and removed. Thus, a carbon-metal composite having an unchanged shape and a reduced volume before and after the first heat treatment process can be obtained. Since the shape of the coordination polymer is maintained even after the first heat treatment process, the particle shape of the final product can be easily controlled, as indicated above.

The carbon-metal composite prepared using the first heat treatment process under an inert atmosphere may have a predetermined periodicity. Such periodicity is due to the repeating unit having a one-, two-, or three-dimensional morphology, and denotes that the repeated high regularity of the coordination polymer is maintained after heat treatment. Such periodicity can be measured by X-ray diffraction analysis of the carbon-metal composite obtained using the first heat treatment process, and at least one peak is present at d-spacings of 6 nm or greater. Such periodicity affects the properties of the final porous carbon prepared from the carbon-metal composite and thus a carbon material having pores with an average diameter ranging from about 10 nm to about 100 nm can be provided.

The second heat treatment process under an oxygen-containing atmosphere may be performed at a temperature ranging from about 200 to about 600° C. and for from about 0.1 to about 24 hours. When the temperature of the second heat treatment process is less than about 200° C., the metal is not oxidized sufficiently. When the temperature of the second heat treatment process is greater than about 600° C., carbon is removed and thus only metal compounds remain. When the second heat treatment processing time is less than about 0.1 hours, the effect of the heat treatment is not sufficient. When the second heat treatment processing time is greater than about 24 hours, the heat treatment is not economical.

A porous carbon material is obtained by heating a coordination polymer to obtain a carbon-metal oxide composite and then removing the metal oxide from the composite. The metal oxide can be removed by base treatment or acid treatment. For example, when the primary metal of the coordination polymer is a transition metal, a lanthanide, an actinide, etc., the carbon-metal oxide formed from these coordination polymers may be removed by acid treatment. The acid treatment may comprise dipping in hydrochloric acid, sulfuric acid, nitric acid, fluoric acid, etc. for from about 0.1 to about 72 hours.

Meanwhile, when the primary metal element of the coordination polymer is a Group 13, 14 or 15 metal or a transition metal of Group 5 or below, the metal oxide can be removed by base treatment. The base treatment may comprise dipping the carbon-metal oxide composite in a base solution such as sodium hydroxide, potassium hydroxide, ammonium hydroxide, etc. for from about 1 to about 72 hours.

The porous carbon according to one embodiment of the present invention has an average pore diameter ranging from about 10 nm to about 100 nm, which is larger than the average pore diameter of the porous carbon material prepared using conventional sol gel or template methods. Also, $d_{002}$ ranges from about 3.35 to about 3.50 Å, which indicates excellent crystallinity. Specifically, a porous carbon material having good crystallinity of about 3.4 Å can be obtained under a heat treatment temperature of about 1000° C.

The porous carbon material according to one embodiment of the present invention has the same shape as the coordination polymer crystal (i.e., a multilateral shape), and specifically, has needle-shaped or plate-shaped particles.

The porous carbon material according to one embodiment of the present invention can be used as a cathode active material for a lithium secondary battery, an electrode for an electrochemical double layer capacitor (EDLC), a catalyst support, or an electrode material for a water softener.

Hereinafter, the present invention will be described with reference to the following examples. However, these examples are presented for illustrative purposes only and are not intended to limit the scope of the invention.

EXAMPLE 1

Figure 1:
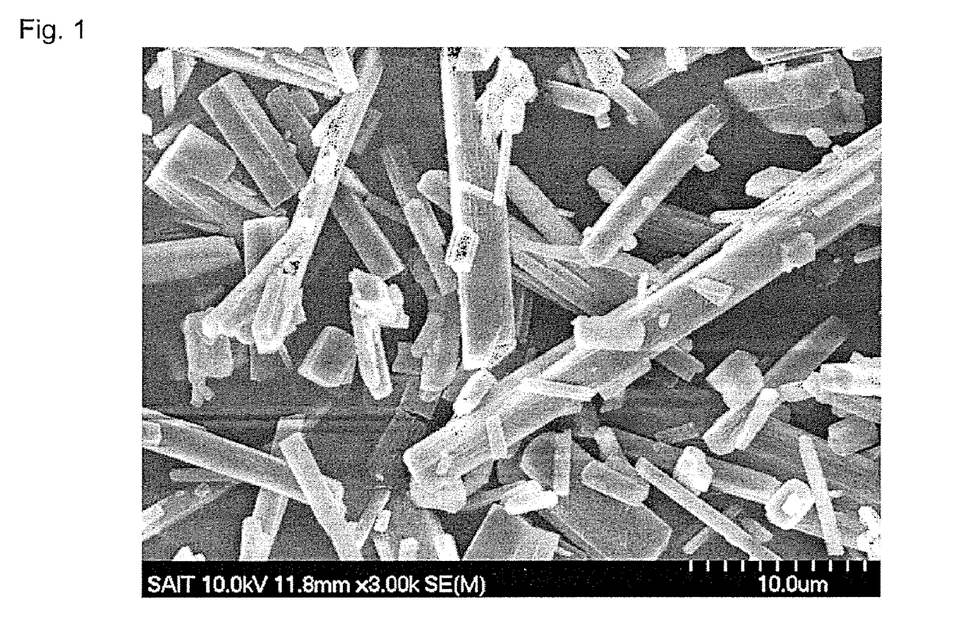
FIG. 1 is a scanning electron microscope (SEM) image of a coordination polymer crystal prepared according to Example 1.

37.33 g of nickel (II) acetate tetrahydrate and 19.96 g of trimesic acid were added to 500 ml of distilled water and stirred at 55° C. for 2 hours. Powders produced in the solution were separated using a nylon filter, washed with distilled water several times, and then dried in an oven at 80° C. for 12 hours to obtain a crystalline coordination polymer. FIG. 1 is a scanning electron microscope (SEM) image of the crystalline coordination polymer prepared according to this example.

Figure 2:
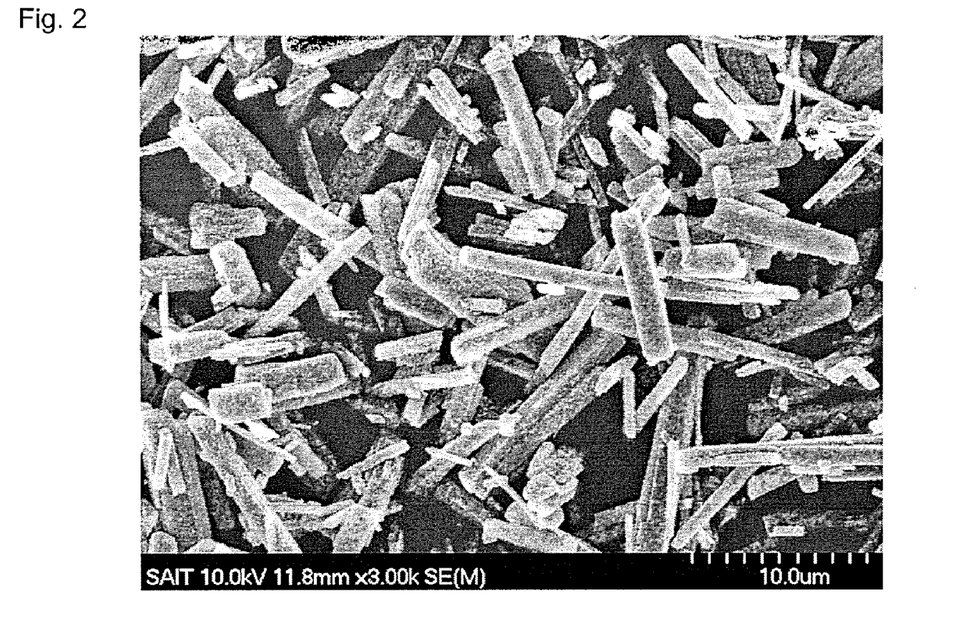
FIG. 2 is a SEM image of a carbon-nickel composite prepared according to Example 1.

The obtained crystalline coordination polymer was subjected to a first heat treatment process under an Ar atmosphere at 900° C. for 1 hour to prepare a carbon-nickel composite. FIG. 2 is a SEM image of the obtained carbon-nickel composite. Referring to FIGS. 1 and 2, the carbon-nickel composite had the same shape as the untreated crystalline coordination polymer and a reduced volume.

Figure 3:
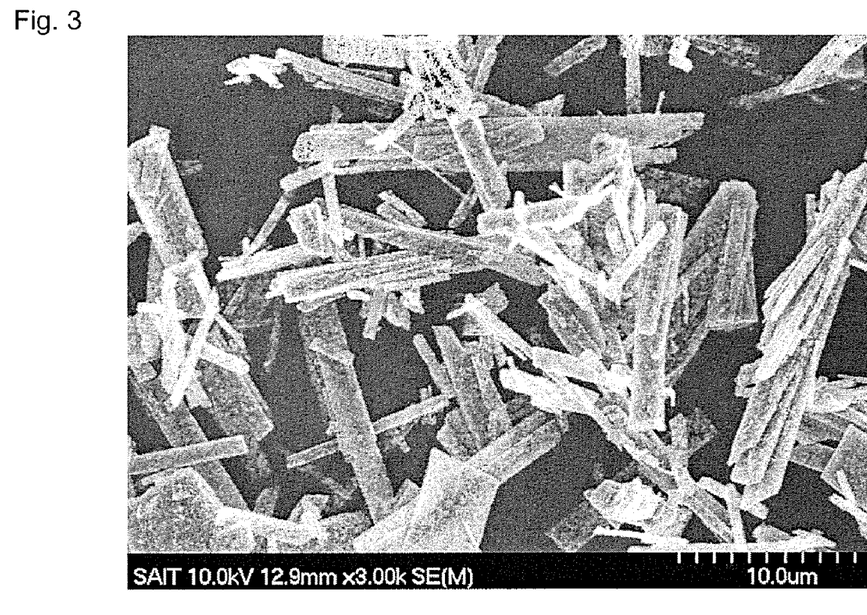
FIG. 3 is a SEM image of a carbon-nickel oxide composite prepared according to Example 1.
Figure 4A:
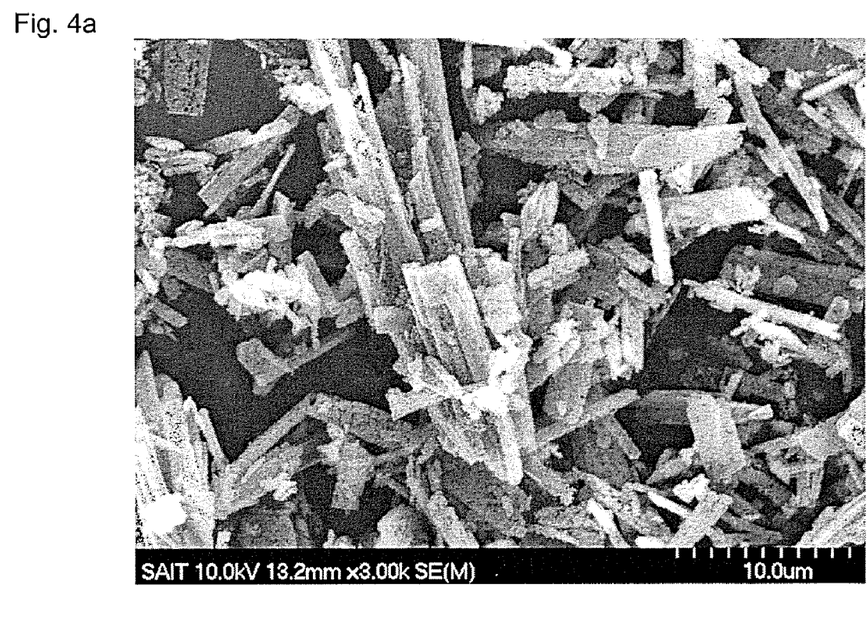
FIGS. 4A and 4B are SEM images at different magnifications of a porous carbon material prepared according to Example 1.
Figure 4B:
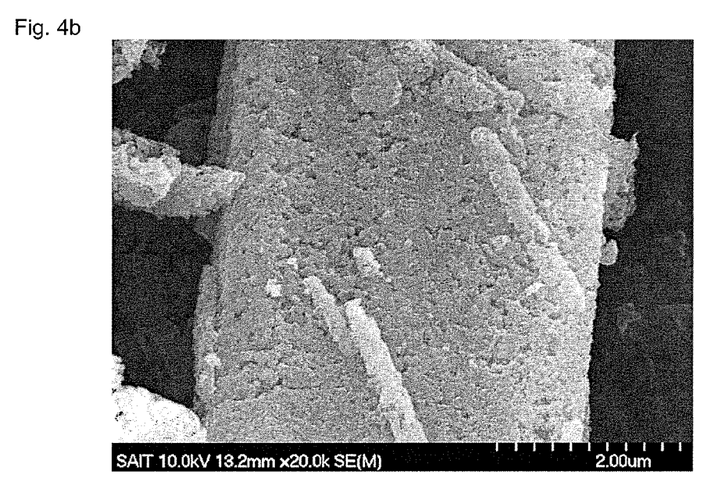

Next, the carbon-nickel composite was subjected to a second heat treatment process in air at 400° C. for 2 hours to prepare a carbon-nickel oxide composite. FIG. 3 is a SEM image of the obtained carbon-nickel oxide composite. The carbon-nickel oxide composite was dipped in a 37% hydrochloric acid solution for 48 hours. The carbon-nickel oxide was then filtered and dried to remove the nickel oxide, thereby preparing the targeted porous carbon material. FIGS. 4A and 4B are SEM images at different magnifications of the obtained porous carbon material.

Figure 5:
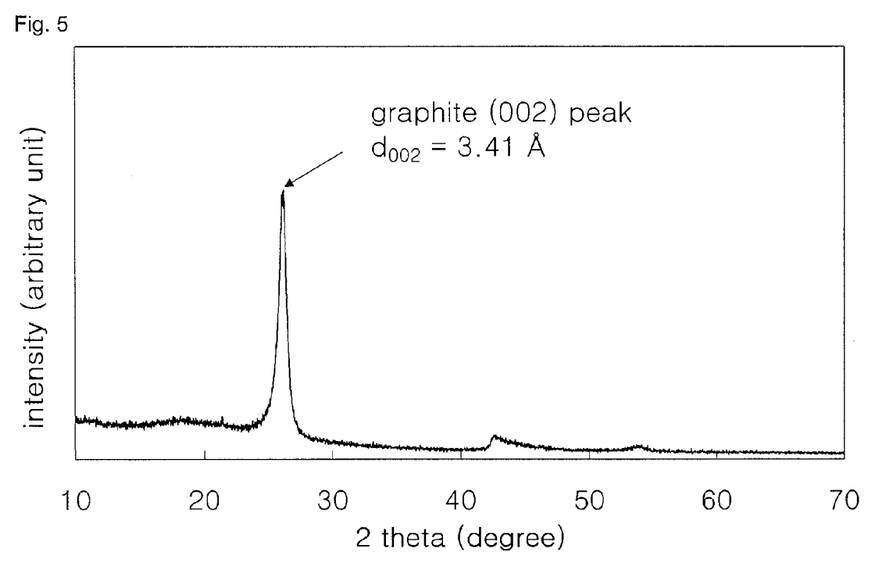
FIG. 5 is an X-ray diffraction (XRD) graph of a porous carbon material prepared according to Example 1.

The XRD graph of the obtained porous carbon material was measured and is shown in FIG. 5. As shown in FIG. 5, only the X-ray diffraction peaks corresponding to carbon are observed, which means that the nickel oxide is completely removed. Also, the $d_{002}$ was 3.41 Å, which indicates excellent crystallinity.

Figure 6:
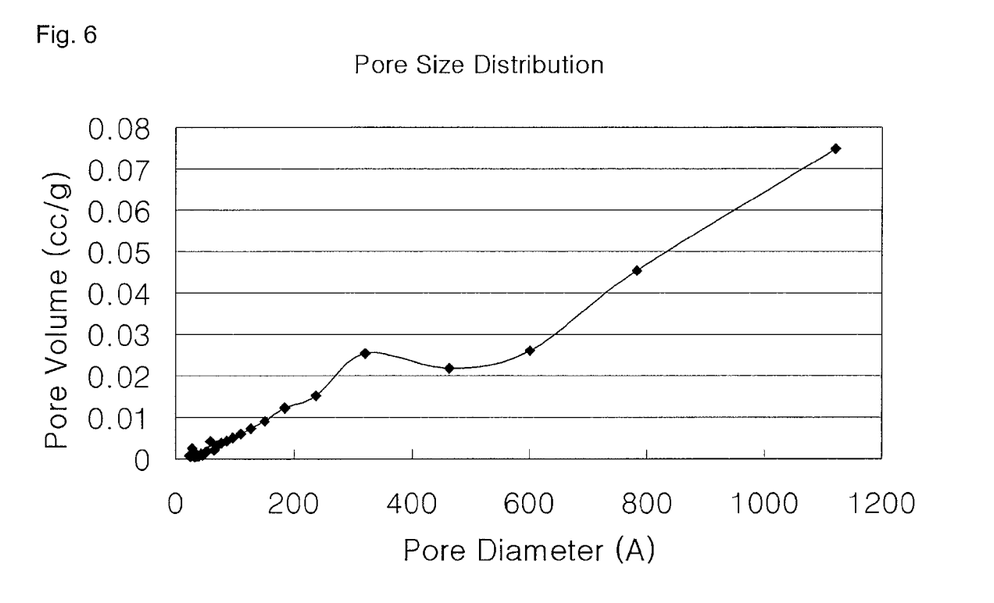
FIG. 6 is a graph illustrating the effect of nitrogen adsorption on the porous carbon material prepared according to Example 1.

FIG. 6 is a graph illustrating the pore diameter distribution of the obtained porous carbon material measured using a nitrogen adsorption technique. Most of the pores were in the range of 10 nm or greater. The average pore diameter (i.e., four times the total pore volume divided by the surface area) was 15.9 nm, and the Brunauer-Emmett-Teller (BET) surface area was 70.43 m²/g.

EXAMPLE 2

Figure 7:
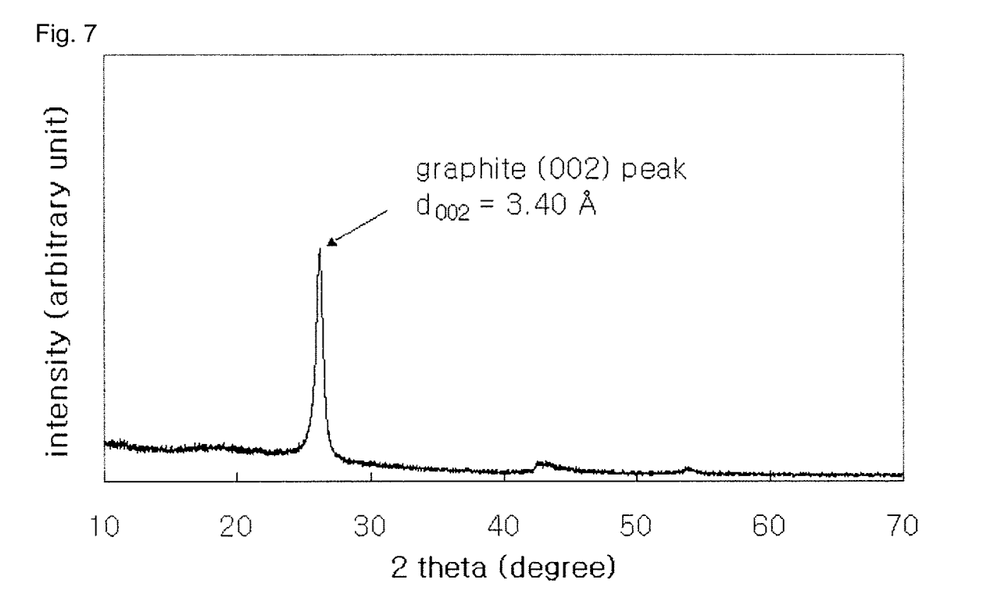
FIG. 7 is an XRD graph of a porous carbon material prepared according to Example 2.
Figure 8:
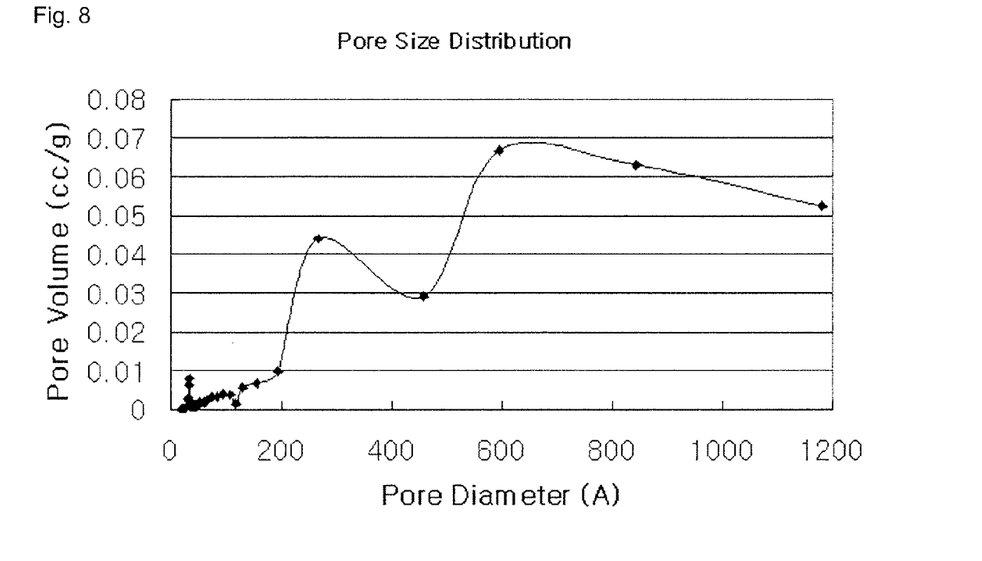
FIG. 8 is a graph illustrating the result of nitrogen adsorption on the porous carbon material prepared according to Example 2.

A porous carbon material was prepared as in Example 1, except that the second heat treatment process was performed at 300° C. for 5 hours. The XRD graph of the porous carbon material was measured and is shown in FIG. 7. Also, FIG. 8 is a graph illustrating the pore diameter distribution of the obtained porous carbon material measured using a nitrogen adsorption technique. Also, the $d_{002}$ was 3.40 Å, which is similar to that measured in Example 1. The average pore size was 23.5 nm, and the BET surface area was 53 m²/g.

EXAMPLE 3

A slurry was prepared by dispersing 75 weight % of the porous carbon material prepared in Example 1, 15 weight % of an artificial graphite (SFG6, available from Timcal), and 10 weight % of PVDF in N-methylpyrrolidone. Then, the slurry was coated on a copper foil to a thickness of about 30 μm and dried to manufacture an anode.

A circular electrode having a diameter of 14 mm was cut out, and lithium metal was used as a counter electrode to manufacture a CR2016-sized coin cell. 1.3 M lithium hexafluorophosphate dissolved in ethylenecarbonate/diethylcarbonate (volume ratio 3:7) was used as an electrolyte.

EXAMPLE 4

A coin cell was manufactured as in Example 3 except that the porous carbon material obtained in Example 1 was heated with Tin(II) 2-ethylhexanoate in an Ar atmosphere at 400° C. for 30 minutes, and the resulting porous carbon-tin oxide composite was used as the anode active material.

EXPERIMENTAL EXAMPLE

Figure 9:
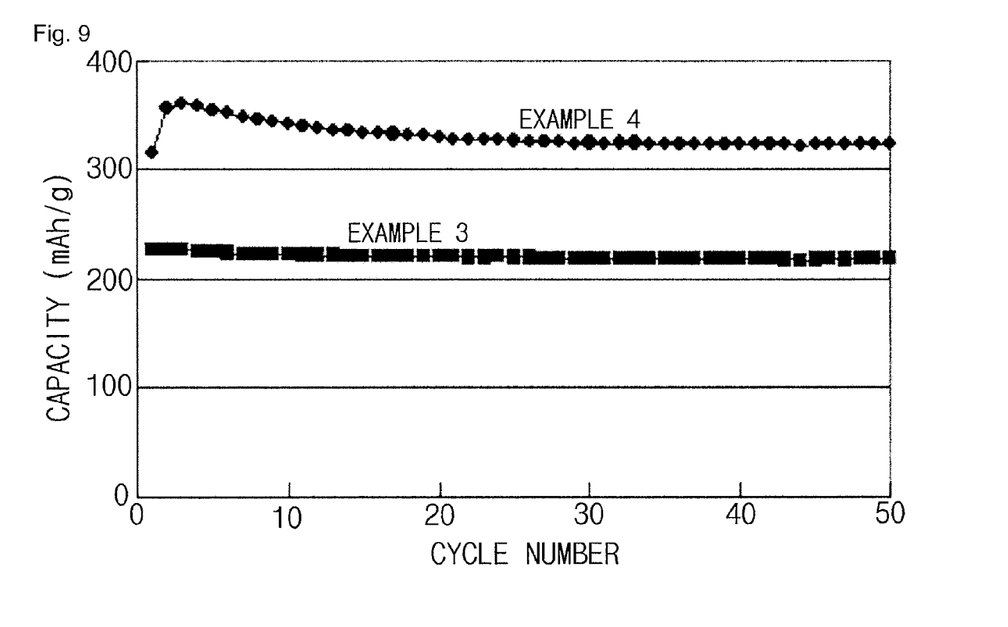
FIG. 9 is a graph illustrating the measured capacity of the cells manufactured according to Examples 3 and 4.

The cells manufactured in Examples 3 and 4 were charged and discharged 50 times at a current of 50 mA/g, in the range of 0.001 to 1.5V, to measure the capacity of the cells. FIG. 9 is a graph illustrating the capacity variation upon cycling of the cells manufactured in Examples 3 and 4. As illustrated in FIG. 9, the cells obtained in Examples 3 and 4 show good cycle life properties.

The porous carbon materials according to the present invention are obtained by heating coordination polymers. The pore diameters of the porous carbon materials can be controlled to about 10 nm or greater. The porous carbon materials can have good crystallinity by using a low-temperature heat treatment process at a temperature of about 100° C. or lower. Thus, the conductivity of the porous carbon materials is improved, and the porous carbon materials can be used as active materials in secondary batteries, electromechanical double layer capacitors, electrode materials for water softeners, catalyst supports for fuel cells, etc.

While the present invention has been illustrated and described with reference to certain exemplary embodiments, it will be understood by those of ordinary skill in the art that various changes and modifications can be made to the described embodiments without departing from the spirit and scope of the present invention as defined by the following claims.

What is claimed is:

1. A method of manufacturing a porous carbon material, the method comprising:
   heat treating a coordination polymer to form a carbon-metal oxide composite; and
   removing metal oxide from the carbon-metal composite to form the porous carbon material, wherein the coordination polymer comprises a compound having a unit cell structure represented by Formula 1:

$$M_xL_yS_z \qquad \text{Formula 1}$$

wherein:
   M is a metal selected from the group consisting of transition metals, Group 13 metals, Group 14 metals, Group 15 metals, lanthanides and actinides;
   L is a multi-dentate ligand ionically or covalently bonded to at least two metal ions;
   S is a monodentate ligand ionically or covalently bonded to one metal ion;
   d is a number of functional groups of L that can bind to a metal ion; and
   x, y and z are integers satisfying $yd+z \leqq 6x$.

2. The method of claim 1, wherein the heat treating of the coordination polymer comprises:
   a first heat treatment process wherein the coordination polymer is heat treated in an inert atmosphere to form a carbon-metal composite; and
   a second heat treatment process wherein the carbon-metal composite is heat treated in an oxygen-containing atmosphere to form the carbon-metal oxide composite.

3. The method of claim 2, wherein the first heat treatment process is performed at a temperature ranging from about 700° C. to about a melting point of a primary metal element of the coordination polymer.

4. The method of claim 2, wherein the second heat treatment process is performed at a temperature ranging from about 200 to about 600° C.

5. The method of claim 1, wherein the coordination polymer comprises a network structure comprising metal ions connected by at least one multi-dentate ligand.

6. The method of claim 1, wherein the multi-dentate ligand is selected from the group consisting of trimesate-based ligands represented by Formula 4, terephthalate-based ligands represented by Formula 5, 4,4'-bipyridine-based ligands represented by Formula 6, 2,6-naphthalenedicarboxylate-based ligands represented by Formula 7, and pyrazine-based ligands represented by Formula 8:

Formula 4

Formula 5

Formula 6

Formula 7

-continued

Formula 8 wherein each of $R_1$ through $R_{25}$ is independently selected from the group consisting of hydrogen atoms, halogen atoms, hydroxy groups, substituted and unsubstituted $C_{1-20}$ alkyl groups, substituted and unsubstituted $C_{1-20}$ alkoxy groups, substituted and unsubstituted $C_{2-20}$ alkenyl groups, substituted and unsubstituted $C_{6-30}$ aryl groups, substituted and unsubstituted $C_{6-30}$ aryloxy groups, substituted and unsubstituted $C_{2-30}$ heteroaryl groups, and substituted and unsubstituted $C_{2-30}$ heteroaryloxy groups.

7. The method of claim 1, wherein the metal M is selected from the group consisting of Fe, Pt, Co, Cd, Cu, Ti, V, Cr, Mn, Ni, Ag, Pd, Ru, Mo, Zr, Nb, La, In, Sn, Pb, Bi and combinations thereof.

8. The method of claim 1, wherein the removing the metal oxide comprises treating the carbon-metal oxide composite with an acid selected from the group consisting of nitric acid, hydrochloric acid, sulfuric acid, and fluoric acid.

9. The method of claim 1, wherein the removing the metal oxide comprises treating the carbon-metal oxide composite with a base selected from the group consisting of sodium hydroxide, potassium hydroxide, and ammonium hydroxide.

* * * * *